Patented July 29, 1930

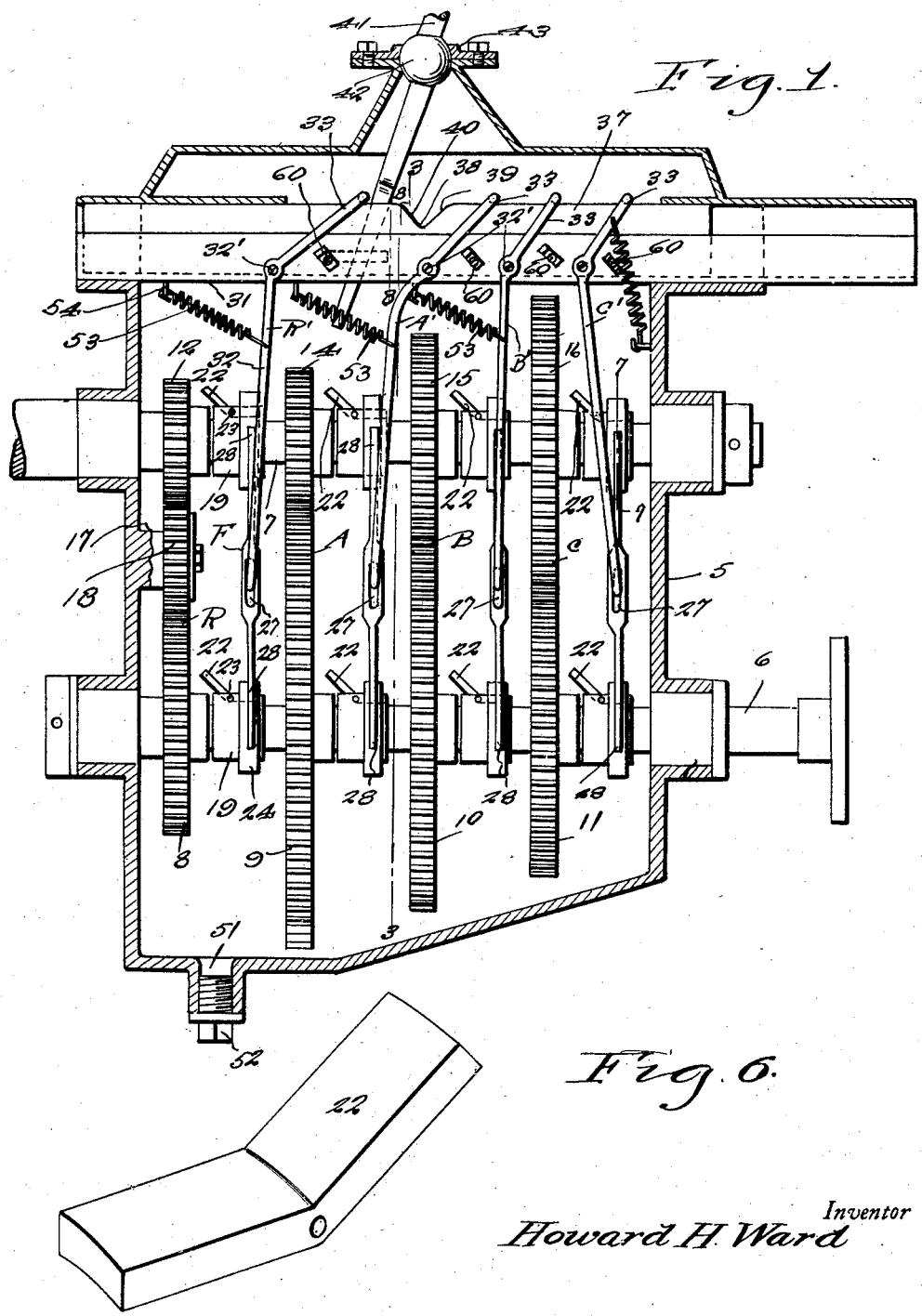

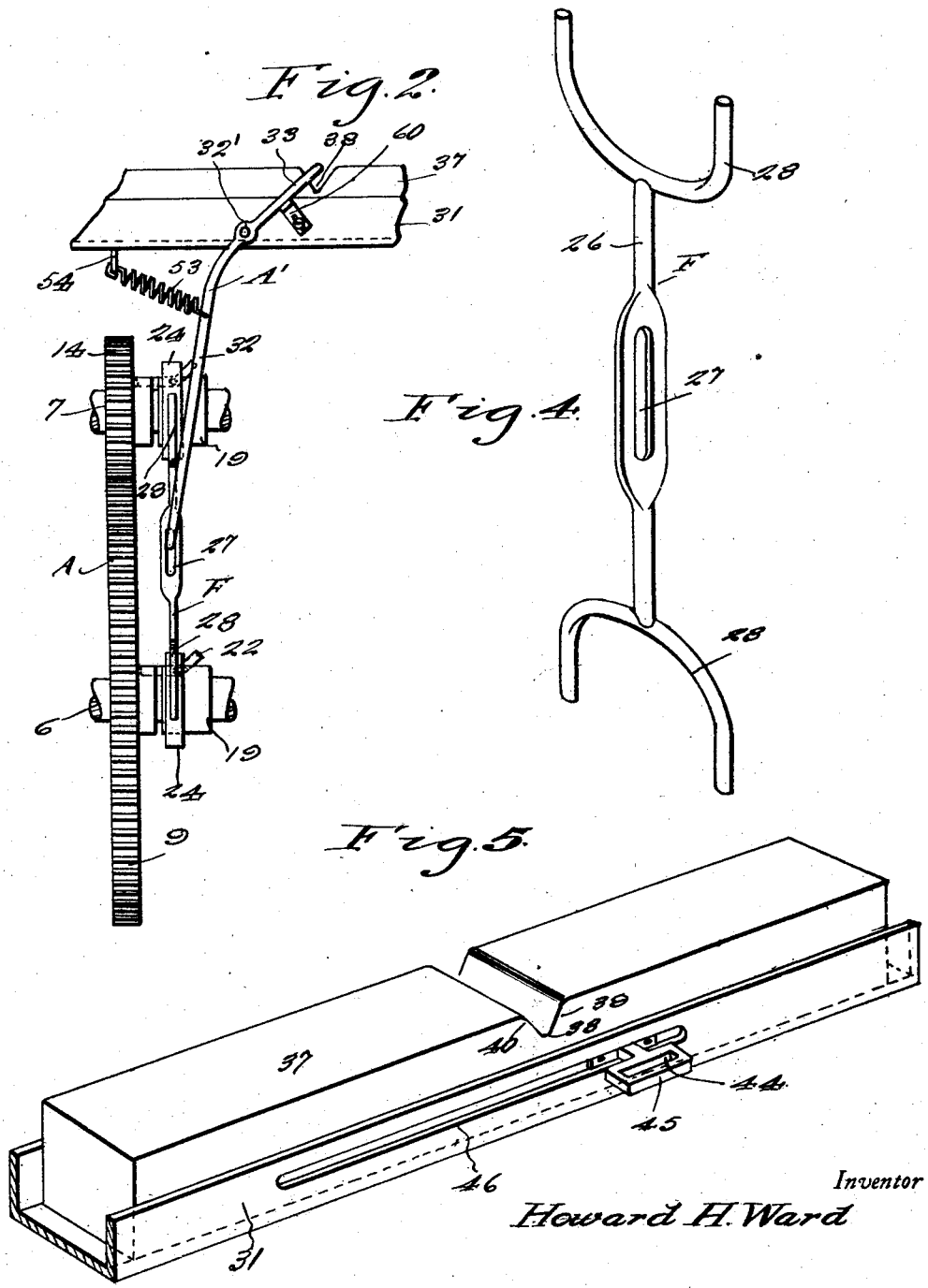

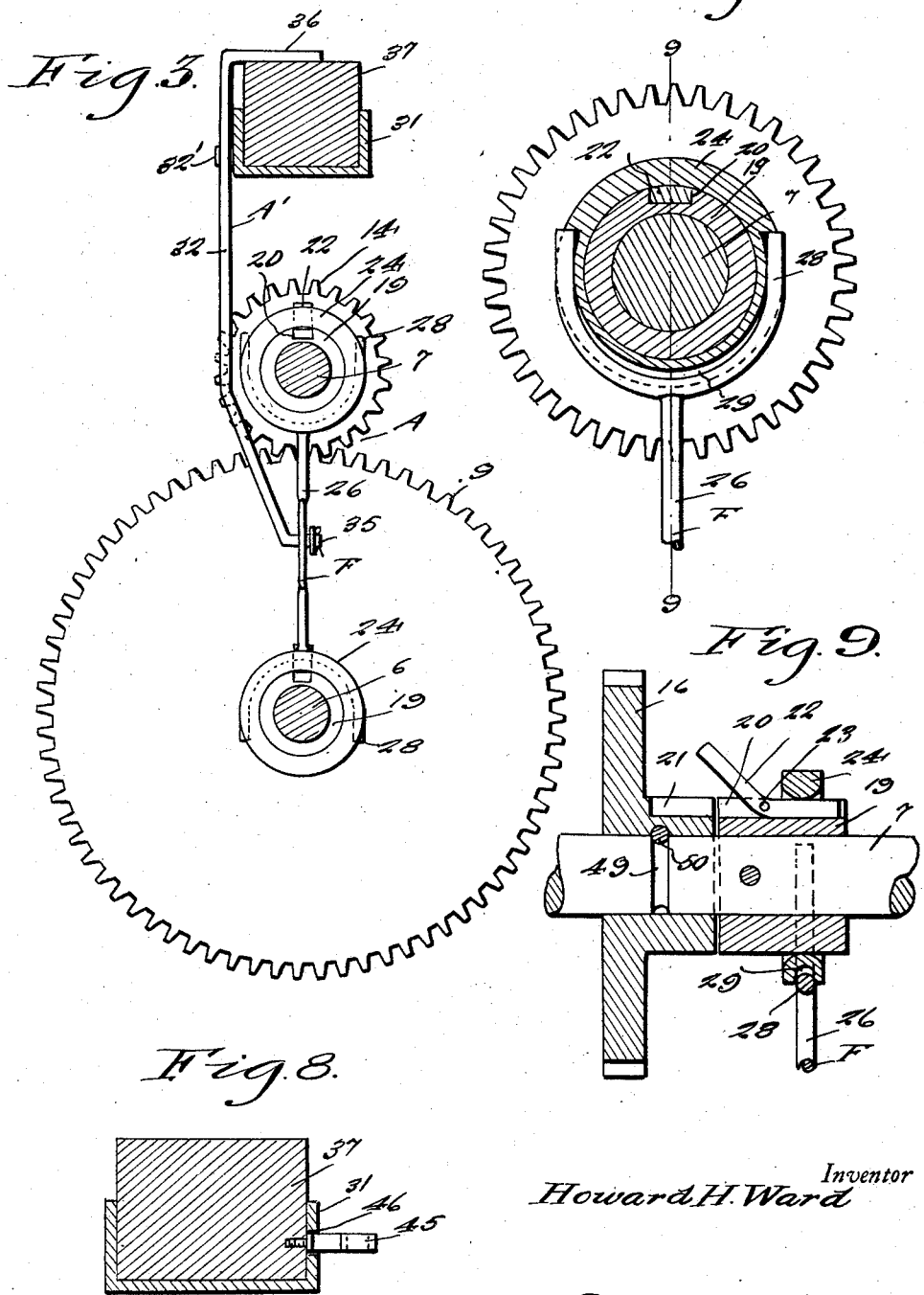

1,771,454

UNITED STATES PATENT OFFICE

HOWARD HENRY WARD, OF ELWOOD, NEBRASKA

TRANSMISSION MECHANISM

Application filed October 20, 1928. Serial No. 313,847.

The present invention relates to a transmission and has for its prime object to provide a mechanism whereby a single lever may be actuated to change the ratio of gearing between the drive and driven shaft without the necessity of using independent clutch means and without the necessity of rocking the lever in more than one plane.

A still further very important object of the invention resides in the provision of a transmission mechanism of this nature which is simple in its construction, compact and convenient in its arrangement of parts, strong and durable, not likely to easily become out of order, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a longitudinal section through the transmission mechanism embodying the features of my invention, Figure 2 is an enlarged detail fragmentary elevation showing one set of gears with the clutches engaged, Figure 3 is a vertical transverse section taken substantially on the line 3—3 of Figure 1, Figure 4 is a perspective view of one of the double fork members, Figure 5 is a perspective view of the slide in the slideway, Figure 6 is a perspective view of one of the dogs, Figure 7 is an enlarged detail section taken substantially on the line 7—7 of Figure 1, Figure 8 is an enlarged detail section taken substantially on the line 8—8 of Figure 1, and Figure 9 is a section taken substantially on the line 9—9 of Figure 7.

Referring to the drawing in detail it will be seen that the numeral 5 denotes a case having drive shaft 6 journaled therein and a driven shaft 7 also journaled therein. These shafts 6 and 7 are disposed in parallelism.

On the shaft 6 there is rotatably mounted gears 8, 9, 10 and 11 while on the shaft 7 there is rotatable gears 12, 14, 15 and 16. A stub counter shaft 17 is mounted in the casing and has journaled thereon a counter gear 18 meshing with the gears 8 and 12. The gears 8, 18 and 12 provide the reverse gearing which is denoted generally by the letter R.

Gears 9 and 14 provide the low speed gearing denoted generally by the letter A. Gears 10 and 15 provide the intermediate speed denoted by the letter B. Gears 11 and 16 provide high speed and are denoted by the letter C.

Adjacent each of the gears on the shafts 6 and 7 there is fixed to the respective shaft a collar 19 which is formed with a groove 20 and the gear is formed in its hub portion with a groove 21. An angular shaped dog 22 is rockable intermediate its ends as at 23 in the groove 20.

A ring 24 is slidable over the collar 19 for the purpose of rocking the dog 21 from the disengaged position shown in Figure 9 to an engaged position as shown in Figure 2 that is so that one arm of the dog extends into the groove 21 thereby locking the gear and the collar together to cause rotation of the gear on the drive shaft or rotation of the collar and driven shaft from the gear thereon as will be more apparent as the description proceeds.

A double fork member F is provided for each speed A, B, C and R. Each member F includes an elongated shank 26 the center portion of which is provided with a longitudinally extending slot 27 and the ends of which are provided with forks 28 to be received in grooves 29 formed in the collars 24.

A plurality of levers R', A', B', and C' are provided in the casing and are rockable at spaced intervals along a sildeway in the upper portion of the casing 5, the pivots being denoted by the numerals 32'. Each lever comprises an arm 32 and an arm 33 projecting from the fulcrum point in angular relation to each other. The arm 32 terminates in an extension 35 in the respective slots 27 while the end of the arm 33 terminates in a lateral projection 36 for extending over the upper edge of a slide 37 in the slideway 31.

This slide 37 is provided on its upper surface with a notch 38 forming inclined walls 39 and 40. A ball 42 intermediate the ends of the lever 41 is rockable in a socket structure 43 and the inner end of the lever projects through the slot 44 of a member 45 fixed to one side of the slide 37 and projecting through a slot 46 in the slideway 31.

In order to prevent sliding movement of the gears on the shafts 6 and 7, the shafts are provided with annular grooves 49 and the hubs of the gears with pins 50 extending tangentially through the grooves.

An opening 51 is provided in the bottom of the casing 5 and receives a plug 52. It is preferable to have the gearing running in oil and of course the oil may be drained from the casing by removing the plug 51. A plurality of springs 53 are anchored as at 54 to the slideway 31 and are anchored to upper portions of the arms 32 of the various levers A', B', C' and R' and these springs tend to urge the swinging of these levers so as to slide the collars 24 controlled thereby into engaging positions as shown in Figure 2 that is to lock the respective gears on the shafts 6 and 7. But lateral projections 36 normally prevent this since they are normally engaged with the upper surface of the slide 37 but when the slide 37 is shifted to a position so that one of the projections 36 may swing down into the notch 38 it will be seen that the respective spring and lever will rock to cause the engagement of the respective gears. By way of example suppose that the slide 37 in Figure 1 is shifted to the right placing the notch 38 under the projection 36 of the lever A', it will be seen that this lever A' will be swung in a clockwise direction by its spring 53 to shift the respective fork member F and the respective collars 24 to rock the respective dogs 22 so as to lock gears 9 and 14 of low speed gearing A, shafts 6 and 7 respectively and shaft 7 will be driven at a relatively low rate of speed in respect to the shaft 6.

The inclined surfaces or walls 39 and 40 cause this lever A' to be rocked to a disengaged position whenever the slide 37 is shifted in either direction. Thus it will be seen that the lever 41 may be rocked in one direction namely counter clockwise to cause the progressive engagement of low speed, intermediate speed, and high speed gearing in the order mentioned without the necessity of using the ordinary clutch structure as is found in the conventional gear shift mechanism now in common use on automobiles. From neutral position, by shifting the lever in the opposite direction, the reverse speed mechanism may be thrown into operation.

A plurality of stops 60 are mounted on the slideway 31 for abutment by the arms 33 of the levers, A', B', C' and R' when the same are rocked by their respective springs 33 as clearly indicated in Figure 2 they prevent the projection 36 from movement all the way down into the notch 38.

It is thought that the construction, operation, utility and advantages of this invention will now be quite apparent to those skilled in this art without a more detailed description thereof.

The present embodiment of the invention has been disclosed in detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A transmission mechanism of the class described including, in combination, a drive shaft, a driven shaft, gearing between the shaft including a gear rotatable on the drive shaft and a gear rotatable on the driven shaft, clutches on each shaft to engage gears thereon, and means for simultaneously actuating the clutch means, said means comprising a lever, means for operatively associating the lever with the clutch means, means rockably mounting the lever, a slideway, a slide in the slideway, said slide being provided with a notch, said lever having a projection over the slide, a spring engaged with the lever to urge the projection against the slide so that said slide may be shifted to allow the spring to move the lever with the projection in the notch and simultaneously engage the clutches.

2. A transmission mechanism of the class described including, in combination, a drive shaft, a driven shaft, gearing between the shaft including a gear rotatable on the drive shaft and a gear rotatable on the driven shaft, clutches on each shaft to engage gears thereon, and means for simultaneously actuating the clutch means, said means comprising a lever, means for operatively associating the lever with the clutch means, means rockably mounting the lever, a slideway, a slide in the slideway, said slide being provided with a notch, said lever having a projection over the slide, a spring engaged with the lever to urge the projection against the slide so that said slide may be shifted to allow the spring to move the lever with the projection in the notch and simultaneously engage the clutches, a stop on the slideway to limit the rocking movement of the lever.

3. A transmission mechanism of the class described including, in combination, a drive shaft, a driven shaft, a plurality of gearings between the shaft, each gearing including a gear rotatable on the drive shaft and another gear rotatable on the driven shaft, clutches on each shaft, one adjacent each gear, a plurality of fork members having forks engaged with the clutches adjacent the gears of respective gearing, a slide way, a slide in the slideway, a plurality of levers rockable on the slide way one for each gearing, said levers having pin and slot connections with the fork members said levers having projections extending over the slide, said slide having a notch into which the projections may move when the slide is shifted in different positions, springs engaged with the levers to normally close them to shift the forks and clutches into engaging position with respective gearings, said projection engaging the slide to prevent the normal operation by the spring except when the notch is disposed under the projection of the gearing lever desired to be brought into operation.

4. A transmission mechanism of the class described including, in combination, a drive shaft, a driven shaft, a plurality of gearings between the shaft, each gearing including a gear rotatable on the drive shaft and another gear rotatable on the driven shaft, clutches on each shaft, one adjacent each gear, a plurality of form members having forks engaged with the clutches adjacent the gears of respective gearing, a slide way, a slide in the slideway, a plurality of levers rotatable on the slideway one for each gearing, said levers having pin and slot connections with the fork members said levers having projections extending over the slide, said slide having a notch into which the projections may move when the slide is shifted in different positions, springs engaged with the levers to normally close them to shift the forks and clutches into engaging position with respective gearings, said projection engaging the slide to prevent the normal operation by the spring except when the notch is disposed under the projection of the gearing lever desired to be brought into operation, and stubs on the slideway to limit the movement of the lever when swung by the spring.

In testimony whereof I affix my signature.

HOWARD HENRY WARD.